United States Patent
Bondar et al.

(10) Patent No.: US 7,332,207 B2
(45) Date of Patent: Feb. 19, 2008

(54) COMPONENT FOR A VEHICLE INTERIOR AND A METHOD OF ASSEMBLY

(75) Inventors: Robert C. Bondar, Grosse Ile, MI (US); Jeffrey N. Conley, Belleville, MI (US); Francois Nelias, Croix (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 288 days.

(21) Appl. No.: 11/012,690

(22) Filed: Dec. 15, 2004

(65) Prior Publication Data

US 2006/0127636 A1    Jun. 15, 2006

(51) Int. Cl.
 B32B 3/00 (2006.01)
 B32B 3/12 (2006.01)
 B32B 3/26 (2006.01)
 B60J 5/00 (2006.01)

(52) U.S. Cl. .................. 428/71; 428/158; 428/167; 428/172; 428/192; 428/304.4; 296/146.7

(58) Field of Classification Search .................. 428/71, 428/76, 158, 167, 172, 192, 304.4; 296/39.1, 296/70, 146.7; 180/90
See application file for complete search history.

(56) References Cited

U.S. PATENT DOCUMENTS

| | | |
|---|---|---|
| 4,420,447 A | 12/1983 | Nakashima |
| 4,661,391 A | 4/1987 | Schroder et al. |
| 5,074,770 A | 12/1991 | Graefe |
| 5,169,574 A | 12/1992 | Leung et al. |
| 5,207,957 A | 5/1993 | Heath et al. |
| 5,476,618 A | 12/1995 | Ito et al. |
| 5,500,168 A | 3/1996 | Suzuki |
| 5,500,169 A | 3/1996 | Kondo et al. |
| 5,558,731 A | 9/1996 | Labrie et al. |
| 5,571,597 A | 11/1996 | Gallagher et al. |

(Continued)

FOREIGN PATENT DOCUMENTS

EP    0 786 160 B1    5/1998

(Continued)

OTHER PUBLICATIONS

Translation of abstract of JP 06-198662, Jul. 1994.

(Continued)

*Primary Examiner*—Donald J. Loney
(74) *Attorney, Agent, or Firm*—Brinks Hofer Gilson & Lione

(57) ABSTRACT

A component for an interior of a vehicle is provided, including a substrate, a skin cooperating with the substrate to define a cavity, and foam disposed within the cavity. The substrate includes a recess defining a side wall and a back wall. The skin includes a primary wall defining a show surface, a perimeter wall extending away from the primary wall and contacting the side wall, and a terminal wall extending away from the perimeter wall. The terminal wall further contacts and applies a force onto the back wall. The foam is disposed within the cavity such as to substantially seal at least one of the perimeter wall and the terminal wall against the substrate. The force acting on the back wall promotes a substantially flam-tight seal, thus preventing foam from leaking between the substrate and the skin.

19 Claims, 4 Drawing Sheets

U.S. PATENT DOCUMENTS

| | | |
|---|---|---|
| 5,580,501 A | 12/1996 | Gallagher et al. |
| 5,618,477 A | 4/1997 | Suzuki |
| 5,643,612 A | 7/1997 | Suzuki |
| 5,736,082 A | 4/1998 | Funato et al. |
| 5,895,613 A | 4/1999 | Nakai et al. |
| 5,895,614 A | 4/1999 | Rivera et al. |
| 5,895,615 A | 4/1999 | Hirata et al. |
| 5,922,431 A | 7/1999 | Funato et al. |
| 5,941,590 A | 8/1999 | Reynolds et al. |
| 5,945,200 A | 8/1999 | Suzuki |
| 5,962,034 A | 10/1999 | Matsumoto et al. |
| 5,972,260 A | 10/1999 | Manni |
| 5,976,289 A | 11/1999 | Kawakubo et al. |
| 6,326,086 B1 | 12/2001 | Mori et al. |
| 6,544,449 B1 | 4/2003 | Gardner |
| 6,635,328 B2 | 10/2003 | Shimabara et al. |
| 6,708,462 B2 | 3/2004 | Pokorzynski et al. |
| 6,749,794 B2 | 6/2004 | Spengler |
| 2003/0118806 A1 | 6/2003 | Schonebeck |
| 2004/0130051 A1 | 7/2004 | Cowelchock et al. |
| 2004/0166302 A1 | 8/2004 | Lee et al. |

FOREIGN PATENT DOCUMENTS

| | | |
|---|---|---|
| EP | 1 201 394 A2 | 5/2002 |

OTHER PUBLICATIONS

Translation of abstract of JP 10-180825, Jul. 1998.

COMPONENT FOR A VEHICLE INTERIOR AND A METHOD OF ASSEMBLY

BACKGROUND

1. Field of the Invention

The present invention relates generally to a component for an interior of a vehicle. More particularly, the invention relates to a component for an instrument panel having a soft-feel portion and a hard-feel portion.

2. Related Technology

Components for vehicle interiors, such as instrument panels, occasionally include a soft-feel portion and a hard-feel portion adjacent to each other. The hard-feel portion is typically formed from a molded, hardened material, such as a polypropylene substrate. A portion of the substrate is coupled with a soft-feel skin having an underlying foam in order to form the soft-feel portion of the component. More specifically, the substrate and the skin are typically engaged with each other and cooperate to define a cavity, which receives the foam by an injection process.

During the current process of manufacturing the component, the substrate and the skin are positioned within an injection mold, each engaged with respective portions of the mold. The skin is secured to its mold portion, such as by a vacuum force acting through a conduit in the mold portion. The mold is then closed and the foam is injected into the cavity. The injected foam expands into every space that is available filling the cavity. Because of this nature of the foam, it may have a tendency leak out of the engagement point between the substrate and the skin. The tendency of the foam to leak from the cavity may be exacerbated by the vacuum force applied to the skin.

Therefore, it would be advantageous to provide a component for an interior of a vehicle, and a method of assembly thereof, including a substrate and skin engaged such as to substantially prevent foam from leaking from the component.

SUMMARY

The present invention overcomes the drawbacks and limitations mentioned above by providing a component for an interior of a vehicle that includes a substrate, a skin cooperating with the substrate to define a cavity, and foam disposed within the cavity. The substrate includes a recess defining a side wall and a back wall. Received in contact with these walls is the skin. The skin includes a primary wall defining a show surface, a perimeter wall extending away from the primary wall and contacting the side wall, and a terminal wall extends away from the perimeter wall. The terminal wall further contacts and applies a force onto the back wall of the recess. The foam is disposed within the cavity walls and when expanded substantially seals the perimeter wall and the terminal wall against the substrate. The force acting on the terminal wall and the back wall promotes a substantially foam-tight seal, thus preventing foam from leaking between the substrate and the skin.

The side wall and the back wall of the substrate define an angle there between. The skin's perimeter and terminal walls similarly define an angle between them. In order to create the force acting on the back wall, the angle defined between the perimeter wall and terminal wall of the skin is greater than the angle defined between the back wall and side wall of the substrate. Thus, when the skin and substrate are engaged with each other, when the unconstrained angle defined between the perimeter and terminal walls is constrained and forced to generally conform with the angle defined between the back and side walls of the substrate, thus causing the force there between.

In another configuration, the recess is further defined by side walls, a back wall having a first depth in a central portion and a second depth, greater than the first depth, in a stepped perimeter portion. When the foam is disposed within the recess the terminal wall of the skin is sealed against the stepped perimeter portion of the back wall. The second depth causes the foam to flow substantially perpendicularly against the terminal wall thereby urging together the terminal wall and the stepped perimeter portion. The seal formed between these two components substantially prevents leakage there between.

Another aspect of the present invention employs a method whereby the skin and the substrate are engaged with opposing portions of a mold. The skin and the first mold portion are urged together by a vacuum force applied to the skin. The vacuum may be applied via a conduit extending through the mold portion holding the skin and coupled with a device generating a suction force. The suction force urges the skin towards the mold portion. To prevent the suction force from urging foam around the terminal walls of the skin and into the conduit, the suction force is reduced or discontinued before, simultaneously with, or just after the foam is deposited within the cavity.

Further objects, features and advantages of this invention will become readily apparent to persons skilled in the art after a review of the following description, with reference to the drawings and claims that are appended to and form a part of this specification.

DETAILED DESCRIPTION

Figure 1:
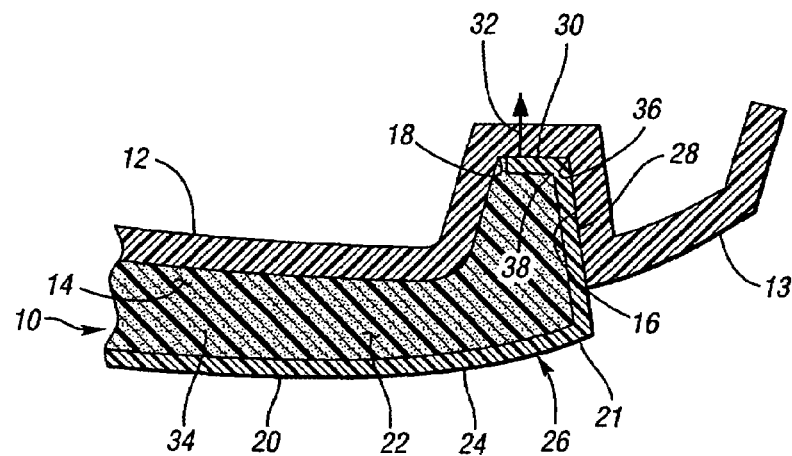
FIG. 1 shows a component for an interior of a vehicle embodying the principles of the present invention, the component including a substrate and a skin defining a cavity and foam disposed within the cavity.

Referring now to the drawings, FIG. 1 shows a component 10 for use in a vehicle interior, such as an instrument panel. The component 10 includes a substrate 12, a skin 20 cooperating with the substrate 12 to define a cavity 22, and foam 34 disposed within the cavity 22.

The substrate 12 defines a hard-feel portion 13 of the instrument panel and provides support for the skin 20 and the foam 34. More specifically, the substrate includes a recess 14 to receive the skin 20, thereby defining the cavity 22 and receiving the foam 34. A side wall 16 defines the depth of the recess 14 and extends in a direction generally perpendicular to the hard-feel portion 13. Furthermore, the recess 14 defines a back wall 18 defining the width of the recess 14 and extending in a direction generally parallel with the hard-feel portion 13.

The skin 20 cooperates with the foam 34 to form a soft-feel portion 21 of the instrument panel. More specifically, the skin 20 includes a primary wall 24 extending generally parallel to the hard-feel surface 13 and confining the foam 34 within the cavity 22. The primary wall 24 of the skin 20 and the hard-feel portion 13 of the substrate 12 define a show surface 26 exposed to the vehicle interior, commonly known as a "class A surface".

The skin 20 also includes a perimeter wall 28 extending away from the primary wall 24 in a substantially unparallel direction. More specifically, the primary wall 24 and the perimeter wall 28 are substantially perpendicular to each other. Furthermore, the skin 20 includes a terminal wall 30 extending away from the perimeter wall 28 in a substantially unparallel direction. More specifically, the perimeter wall 28 and the terminal wall 30 are generally perpendicular to each other.

The skin 20 is engaged with the substrate 12 such that the perimeter wall 28 extends along the side wall 16 and the terminal wall 30 extends along the back wall 18 to provide support for the primary wall 24. More specifically, the perimeter wall 28 and the terminal wall 30 completely engage the side and back walls 16, 18 to hold the substrate 12 and the skin 20 together. The substrate side and back walls 16, 18 define an angle 36 there between, and the skin perimeter and terminal walls define an angle 38 there between. In order to effectively engage the side and back walls 16, 18, the substrate angle 36 engages the skin angle 38 when the respective components are coupled.

As shown in FIG. 1, the foam 34 is typically disposed in the cavity 22 in a manner so as to prevent air pockets. Therefore, the foam 34 is typically inserted into the component 10 via pressurization, such as by injecting the foam 34 into the cavity 22. To prevent the foam 34 from leaking between the terminal wall 30 of the skin 20 and the back wall 18 of the substrate 12, the terminal wall 30 is biased to apply a force 32 onto the back wall 18. The force 32 causes the terminal wall 30 to form a substantially foam-tight seal with the back wall 18 and this substantially prevents the foam 34 from leaking from the component 10.

Figure 2:
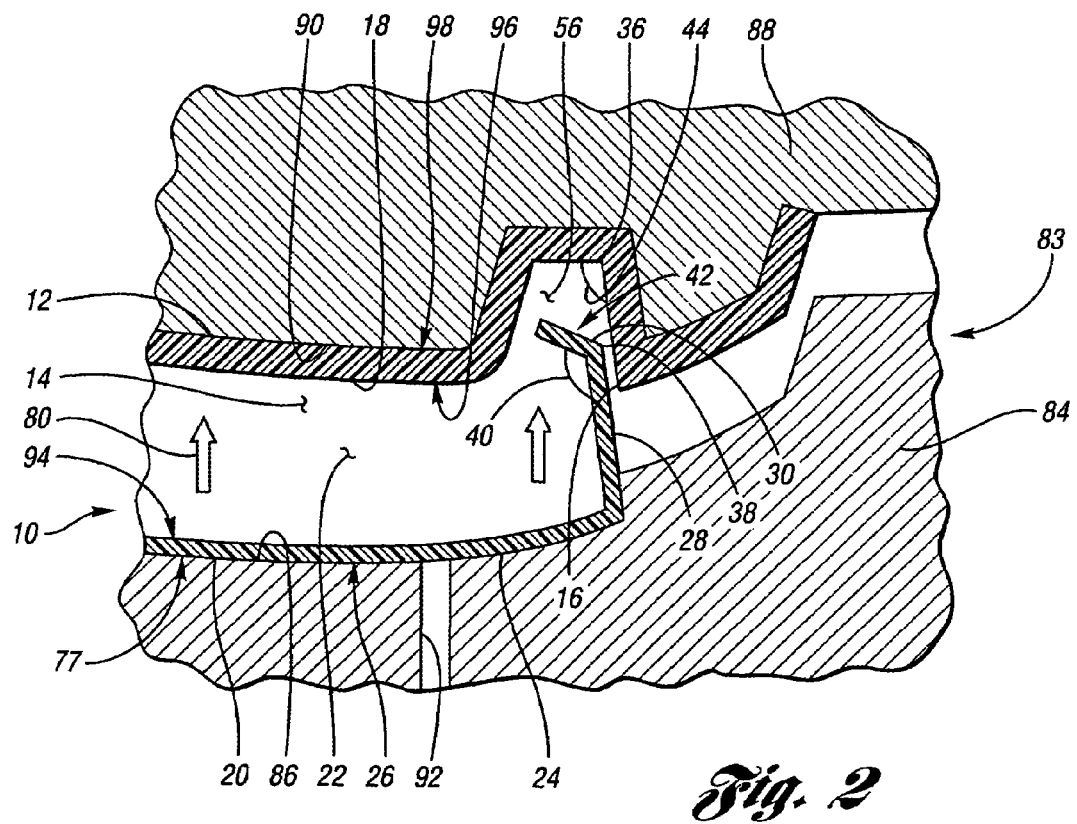
FIG. 2 shows a first partially-assembled view of the component in FIG. 1, the substrate and the skin being respectively disposed on first and second molds and being moved towards each other.
Figure 3:
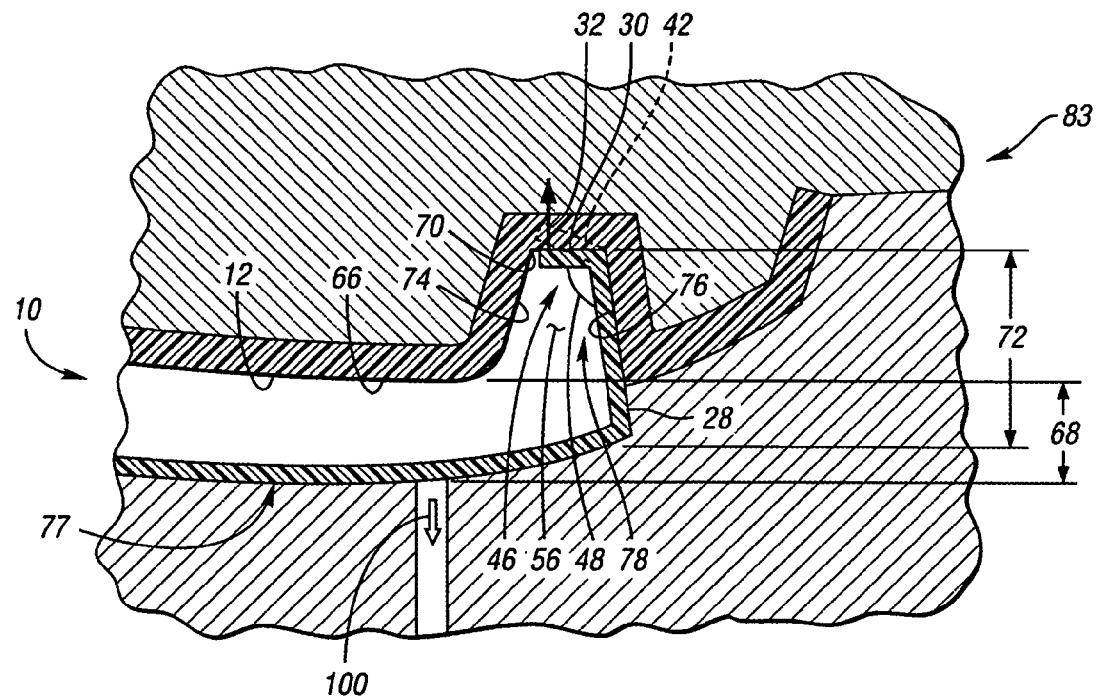
FIG. 3 shows a second partially-assembled view of the component in FIG. 1, wherein the substrate and the skin are engaged with each other to define the cavity.
Figure 4:
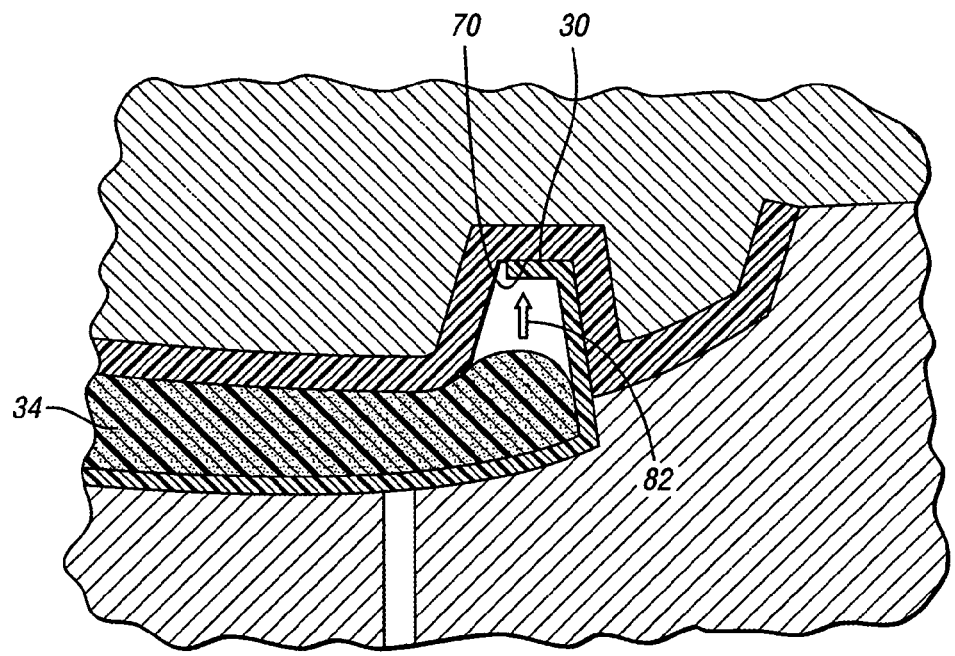
FIG. 4 shows a third partially-assembled view of the component in FIG. 1, wherein the foam is expanding and moving through the cavity.

Referring now to FIG. 2, the component 10 is shown in a partially-assembled state such that the substrate 12 and the skin 20 are not engaged with each other. When the skin 20 is not engaged with the substrate 12, the skin angled portion 38 is in a relaxed, unconstrained state 42 having an unconstrained skin angle 40. As seen in the Figures, the substrate angle 44 is smaller than the unconstrained skin angle 40. Therefore, when the substrate 12 and the skin 20 are engaged, as shown in FIGS. 1, 3, and 4, the skin angled portion 38 is in a constrained state 46 having a constrained skin angle 48 that corresponds with the substrate angle 36. The constraining of the skin angled portion 38 causes the force 32 acting on the back wall 18 of the substrate 12.

Referring now to FIG. 3, the component 10 is shown in a partially-assembled state such that the substrate 12 and the skin 20 are engaged with each other such that the skin 20 is in the constrained state 46. For illustrative purposes, the skin 20 is also shown in a broken line in the unconstrained state 42. The constrained skin angle 48 is preferably equal to the substrate angle 44 so that the respective angled portions 36, 38 completely engage each other. Furthermore, the difference between the unconstrained skin angle 40 and the constrained skin angle 48 is preferably less than 30 degrees. More preferably, the difference between the unconstrained skin angle 40 and the constrained skin angle 48 is preferably greater than 5 degrees and less than 15 degrees. This optimal range of angles will cause the force 32 to be strong enough to prevent foam leakage. Furthermore, the force 32 will not be so strong as to cause the skin 20 to disengage from the substrate 12.

Figure 5:
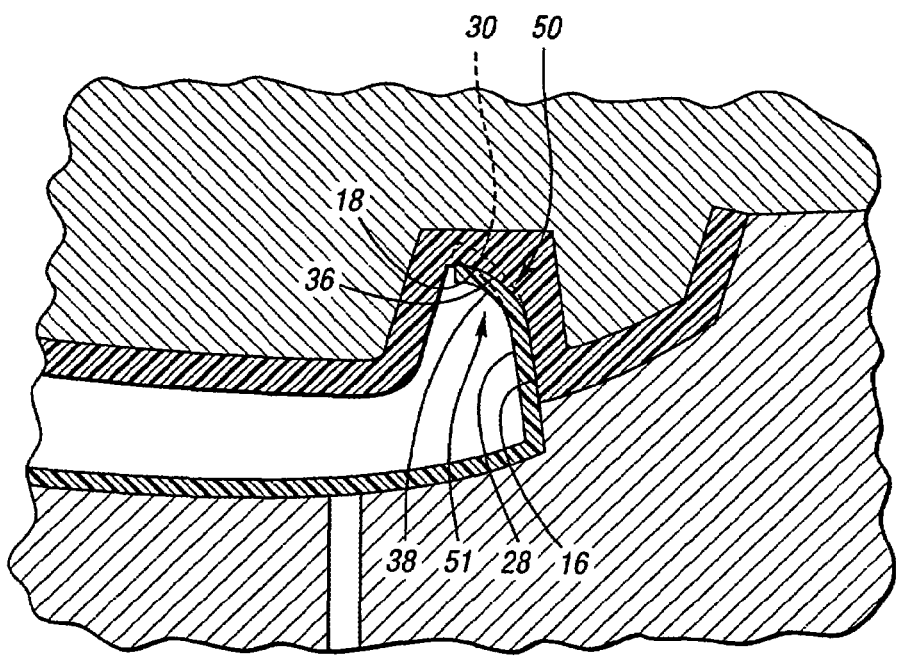
FIG. 5 shows another embodiment of the component in FIG. 1, wherein the substrate includes an angled portion having an arcuate cross-section.

The substrate angle 44 and the skin constrained angle 48 are both substantially equal to 90 degrees in FIGS. 1-4. Alternatively, in an alternative embodiment shown in FIG. 5, the substrate angled portion 36 includes an arcuate cross-section 50. Similarly, the skin angled portion 38 also includes an arcuate cross-section 51 so that the respective angled portions 36, 38 engage each other.

Figure 6:
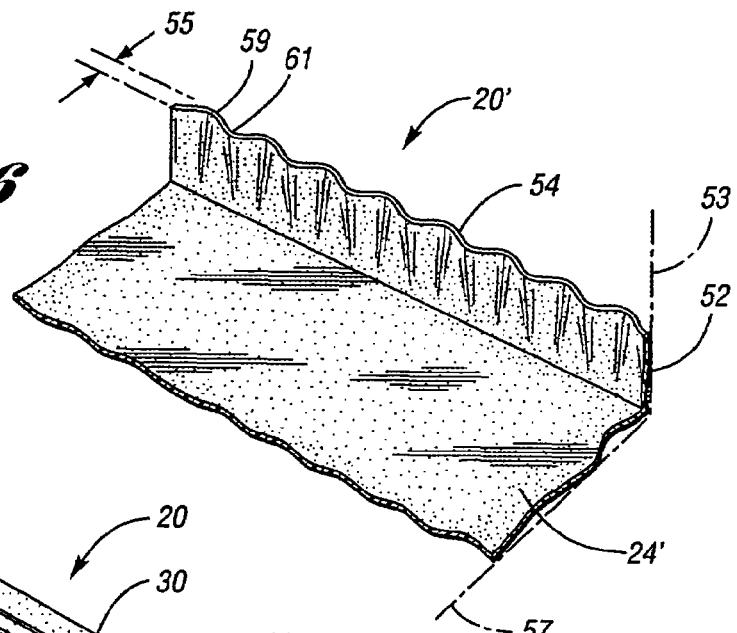
FIG. 6 shows a design currently known in the art having skin with a wave shaped edge that has been deformed by foam.
Figure 7:
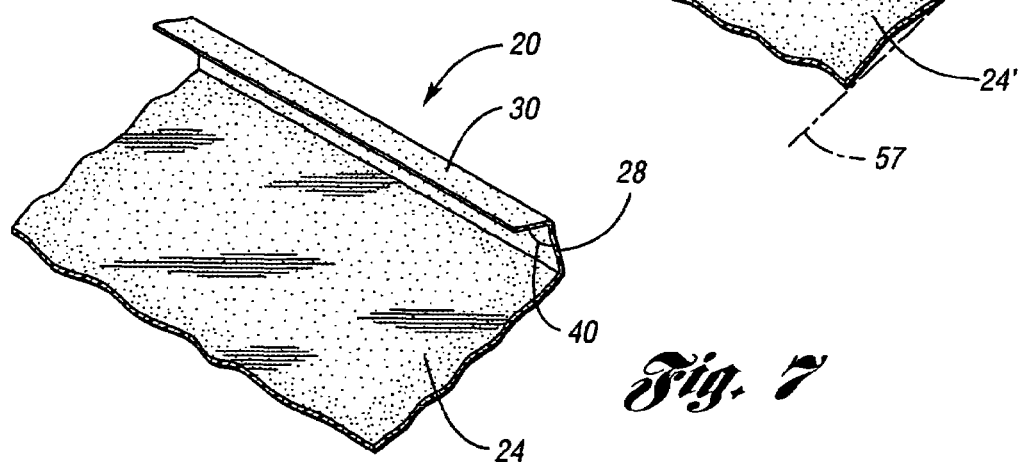
FIG. 7 shows another embodiment of a skin for the component in FIG. 1 having a linear edge.

Referring to FIG. 7, the terminal wall 30 of the skin 20 extends from the perimeter wall 28 at an angle 40; thus stiffening the skin 20 and substantially preventing from displacement of the respective walls 28, 30. More specifically, as depicted by a design known in the prior and shown in FIG. 6, a skin 20' having a single wall 52 extending from a primary wall 24' in a direction 53 is less stiff than the skin 20 shown in FIG. 7. As a result of the insufficient stiffness of the prior art skin 20', the wall 52 is deformed into a wave shaped edge 54 by the expanding foam. More specifically, wall 52 is deformed by a distance 55 in a second direction 57 generally perpendicular to the direction 53. The deformation causes contact portions 59 along the wave shaped edge 54 that contact the substrate and gap portions 61 along the wave shaped edge 54 that do not contact the substrate. Therefore, foam is able to flow between the gap portions 61 and the substrate.

Figure 8:
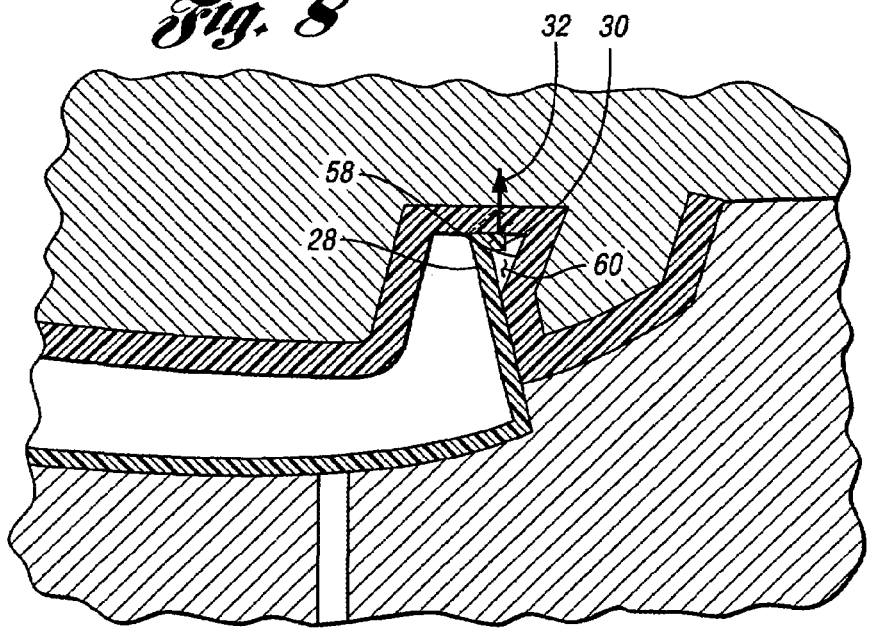
FIG. 8 shows another embodiment of the component in FIG. 1, wherein the terminal wall of the skin is angled outward and the side wall of the substrate recess includes a foam trap.

In an alternative embodiment of the present invention, shown FIG. 8, the substrate side wall 16 and the back wall 18 include a foam trap portion 58 cooperating with the skin 20 to define a foam trap conduit 60. More specifically, the foam trap portion 58 is a channel extending along the substrate 12 to collect foam 34 that leaks past the skin 20. The perimeter wall 28 and the terminal wall 30 of the skin 20 are positioned such that terminal wall 30 extends towards the substrate side wall 16. Similarly to the embodiments described above, the terminal wall 30 is biased to apply a force 32 to the substrate back wall 18.

Figures 9, 10:
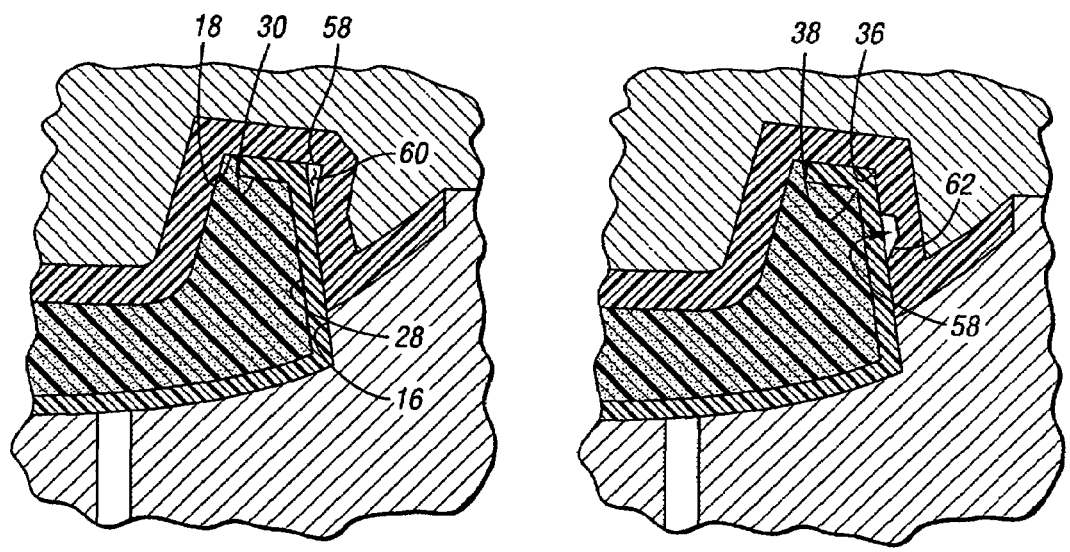
FIG. 9 shows yet another embodiment of the component in FIG. 1, wherein the side wall of the substrate recess includes a foam trap.
FIG. 10 shows another embodiment of the component in FIG. 1, wherein a foam trap is defined by a groove in the substrate.

In yet another embodiment of the present invention, shown FIG. 9, the foam trap portion 58 is defined by the substrate side and back walls 16, 18 similarly to the embodiment shown in FIG. 8. However, in this embodiment, the terminal wall 30 extends away from the substrate side wall 16, creating a greater length of engagement between the terminal wall 30 and the back wall 18.

In another embodiment of the present invention, shown FIG. 10, the foam trap portion 58 is a groove 62 in the side wall 16. More specifically, the foam trap portion 58 is positioned away from the substrate angled portion 36 to avoid potentially compromising the engagement between the skin angled portion 38 and the substrate angled portion 36.

Figure 11:
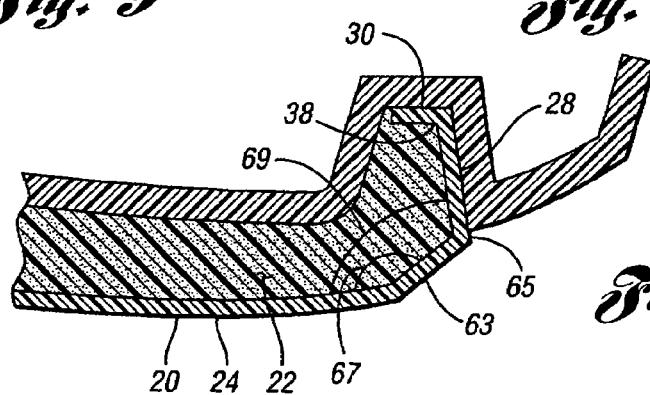
FIG. 11 shows yet another embodiment of the component in FIG. 1, wherein the perimeter wall includes a first portion and a second portion.

In yet another embodiment of the present invention, shown FIG. 11, the perimeter wall 28 includes a first portion 63 extending from the primary wall 24 at a first angle 67 and a second portion extending from the first portion and defining a second angle 69 with the primary wall 24. As shown in the Figure, the first angle 67 is substantially equal to 35 degrees and the second angle is substantially equal to 90 degrees. However, any appropriate angles may be used.

Referring back to FIGS. 1-4, a method of assembling a component 10 embodying the principles of the present invention will now be discussed. The substrate 12, which is preferably made of a hard-setting, moldable material such as polypropylene, is injection molded into a molding device commonly known in the art, such as a substrate mold (not shown). The substrate 12 is then removed from the substrate mold and inserted within a foam mold 83 having a first mold portion 84 and a second mold portion 88. More specifically, the substrate is engaged with a second molding surface 90 of the second mold portion 88 such that a substrate outer surface 98 engages the second molding surface 90 and a substrate inner surface 96 faces the skin 20. Alternatively to the above-described process, the substrate 12 may be formed by any appropriate means.

As shown in FIG. 3, the substrate 12 is formed having a back wall 66 with a first depth 68 and a stepped perimeter portion 70 with a second depth 72. Furthermore, the substrate includes a first side wall 74 connecting the back wall 66 and the stepped perimeter portion 70 and a second side wall 76 extending away from the stepped perimeter portion 70. The second depth 72 is greater than the first depth 68 such as to form a secondary recess 56 to receive the skin 20, as will be discussed in more detail below.

The skin 20 is preferably made of a soft-feel, pliable material such as a vinyl compound, a polyvinyl chloride compound, or a thermoplastic polyolefin. The skin 20 is formed by a process commonly known in the art, such as thermoforming or casting. Cast skins typically have a softer, more desirable feel than thermoformed skins. However, thermoformed skins tend to be less rigid than cast skins, causing thermoformed skins to be more susceptible to foam leakage. Therefore, the present invention may be especially desirable for use with thermoformed skins.

Once the skin 20 is formed by an appropriate process, it is engaged with a first molding surface 86 of the first mold 84. More specifically, a show portion 77 defining the show surface 26 of the skin 20 engages the first molding surface 86 and a skin inner surface 94 faces the substrate 12. Additionally, an engaging portion 78 extends away from the show portion 77 and is received within the secondary recess to engage the stepped perimeter portion 70. The engaging portion 78 shown in FIG. 3 includes the skin perimeter wall 28 and the terminal wall 30, but the skin 20 may have any appropriate configuration.

Once the substrate 12 and the skin 20 are engaged with the respective mold portions 84, 88, the foam mold 83 is closed. The first and second molding surfaces 86, 90 are generally opposite each other such that the substrate 12 and the skin 20 move towards each other in an engaging direction 80 when the foam mold 83 closes. The closed foam mold 83 causes the engaging portion 78 to apply the force 32 onto the substrate 12 in a force direction (generally indicated by arrow 32) that is substantially parallel with the engaging direction 80. Thus, the closing motion of the foam mold 83 automatically causes the engaging portion 78 to become constrained into the constrained state 46. The automatic constraining of the engaging portion 78 reduces complexity of the assembly of the component 10 and improves the seal between the engaging portion 78 and the substrate stepped perimeter portion 70.

A conduit, such as a vacuum conduit 92, extends through the first mold portion 84 to secure the skin 20 to the first molding surface 86. More specifically, the vacuum conduit 92 is in fluid communication with a suction device to apply a vacuum force 100 through the vacuum conduit 92 and onto the skin 20. The suction device may be any appropriate device, such as an air pump. Before the foam 34 is introduced into the cavity 22, the vacuum force 100 creates a first vacuum in the vacuum conduit 92 that is approximately equal to between 15 and 18 inches of mercury. However, a vacuum force this strong may cause the foam 34 to leak between the skin 20 and the substrate 12. Therefore, a smaller, second vacuum force, equal to or less than 5 inches of mercury, is created in the vacuum conduit 92 proximate to the time that the foam 34 is introduced into the cavity 22. More specifically, prior to or simultaneously with the time that the foam 34 is introduced into the cavity 22, the vacuum force 100 is reduced or completely discontinued. This reduced vacuum prevents the foam 34 from entering the conduit 92 and causes the foam 34 to be substantially contained within the cavity.

The foam 34 is next introduced into the cavity 22 by an appropriate means, such as by injection molding. The foam is a two-part substance comprising a polyether blend component and an isocyanate component, such as methylene bisphenyl isocyanate (MDI). In order to more quickly activate the two components of the foam 34 and thus reduce the setting time, the foam mold 83 is heated to a temperature of approximately 100 degrees Fahrenheit before the foam 34 is introduced into the component.

As shown in FIG. 4, the foam 34 next flows through the cavity 22 in a sealing direction 82 that is substantially perpendicular to the skin terminal wall 30 as the foam 34 seals the terminal wall 30 against the stepped perimeter portion 70. The perpendicular orientation of the foam 34 flow minimizes leakage between the terminal wall 30 and the stepped perimeter portion 70 because the force caused by the foam 34 is a sealing force that urges the respective components 30, 70 together.

After the setting of the foam 34, the foam mold 83 is opened and the finished component is removed.

It is therefore intended that the foregoing detailed description be regarded as illustrative rather than limiting, and that it be understood that it is the following claims, including all equivalents, that are intended to define the spirit and scope of this invention.

What is claimed is:

1. A component for an interior of a vehicle comprising:
    a substrate having a recess defining a side wall and a back wall;
    a skin cooperating with the substrate to define a cavity, the skin having a primary wall defining a show surface at least partially defining an outer surface of the vehicle interior component, a perimeter wall extending away from the primary wall and contacting the side wall, and a terminal wall extending away from the perimeter wall, contacting the back wall, and being biased to apply a force onto the back wall; and foam disposed within the cavity such as to substantially seal at least one of the perimeter wall and the terminal wall against the substrate.

2. A component as in claim 1, the substrate including a substrate angled portion between the side wall and the back wall, the skin including a skin angled portion between the perimeter wall and the terminal wall, the skin angled portion having an unconstrained skin angle when the skin portion is in an unconstrained state, the substrate angled portion having a substrate angle, wherein the unconstrained skin angle is greater than the substrate angle, and wherein the skin angled portion is at least partially engaged with the substrate angled portion.

3. A component as in claim 2, wherein the skin angled portion is completely engaged with the substrate angled portion.

4. A component as in claim 2, wherein the skin angled portion is in a constrained state defining a constrained skin angle while engaged with the substrate angled portion.

5. A component as in claim 4, wherein the difference between the unconstrained skin angle and the constrained skin angle is less than 30 degrees.

6. A component as in claim 5, wherein the difference between the unconstrained skin angle and the constrained skin angle is greater than 5 degrees and less than 15 degrees.

7. A component as in claim 4, wherein the constrained skin angle is generally equal to 90 degrees.

8. A component as in claim 2, wherein the substrate angled portion includes a generally arcuate cross-section.

9. A component as in claim 2, the perimeter wall including a first portion extending from the primary wall at a first angle and a second portion extending from the first portion and defining a second angle with the primary wall.

10. A component as in claim 2, wherein the substrate angled portion at least partially defines a secondary recess, and the perimeter wall extends into the secondary recess.

11. A component as in claim 1, the substrate including a foam trap portion cooperating with the skin to define a foam trap conduit.

12. A component as in claim 11, wherein the foam trap portion is a groove in the side wall.

13. A component for an interior of a vehicle comprising:
a substrate having a recess defining side walls, a back wall having a first depth, and a stepped perimeter portion having a second depth;
a skin having a primary wall defining a show surface at least partially defining an outer surface of the vehicle interior component, a perimeter wall extending away from the primary wall, and a terminal wall extending at an angle that is substantially unparallel to the perimeter wall;
wherein the first depth and the second depth are measured from the show surface and the second depth is greater than the first depth; and
foam disposed within the recess such as to substantially seal the terminal wall against the stepped perimeter portion.

14. A component as in claim 13, wherein the side walls include a first side wall connecting the back wall and the stepped perimeter portion and a second side wall extending away from the stepped perimeter portion.

15. A component as in claim 14, wherein the first side wall and the second side wall are substantially parallel to each other.

16. A component as in claim 15, wherein the back wall and the stepped perimeter portion are substantially parallel to each other.

17. A component as in claim 16, wherein the first side wall and stepped perimeter portions are substantially parallel to the primary wall.

18. A component as in claim 13, wherein the angle between the terminal wall and the perimeter wall is substantially equal to 90 degrees.

19. A component as in claim 13, wherein the stepped perimeter portion and at least one of the two side walls are connected by an arcuate portion.

* * * * *